US008095969B2

(12) United States Patent
Dillaway et al.

(10) Patent No.: US 8,095,969 B2
(45) Date of Patent: Jan. 10, 2012

(54) SECURITY ASSERTION REVOCATION

(75) Inventors: Blair B. Dillaway, Redmond, WA (US);
Moritz Y. Becker, Cambridge (GB);
Andrew D. Gordon, Cambridge (GB);
Cedric Fournet, Cambridge (GB);
Brian A. LaMacchia, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1092 days.

(21) Appl. No.: 11/530,443

(22) Filed: Sep. 8, 2006

(65) Prior Publication Data

US 2008/0066170 A1  Mar. 13, 2008

(51) Int. Cl.
*G06F 15/16* (2006.01)

(52) U.S. Cl. .............. 726/6; 726/2; 726/3; 726/4; 726/5; 726/7; 726/18; 713/158; 713/185; 709/225; 709/226

(58) Field of Classification Search .................. 713/155, 713/158, 165, 167, 185; 726/1, 2, 3, 4, 5, 726/6, 7, 14; 709/219, 225, 226, 229
See application file for complete search history.

(56) References Cited

U.S. PATENT DOCUMENTS

| 5,649,099 | A | 7/1997 | Theimer et al. |
| 5,765,153 | A | 6/1998 | Benantar et al. |
| 6,189,103 | B1 | 2/2001 | Nevarez et al. |
| 6,216,231 | B1 * | 4/2001 | Stubblebine ................. 726/10 |
| 6,256,734 | B1 * | 7/2001 | Blaze et al. ................. 713/157 |
| 6,256,741 | B1 | 7/2001 | Stubblebine |
| 6,484,261 | B1 | 11/2002 | Wiegel |
| 6,779,120 | B1 * | 8/2004 | Valente et al. ................. 726/1 |
| 6,931,530 | B2 | 8/2005 | Pham et al. |
| 7,260,715 | B1 * | 8/2007 | Pasieka ................. 713/158 |
| 7,290,138 | B2 * | 10/2007 | Freeman et al. ............. 713/167 |
| 7,426,635 | B1 * | 9/2008 | Parkhill et al. ............... 713/158 |
| 7,506,364 | B2 | 3/2009 | Vayman |
| 7,509,489 | B2 | 3/2009 | Kostal et al. |
| 7,533,265 | B2 | 5/2009 | Ballinger et al. |
| 7,644,284 | B1 * | 1/2010 | Stubblebine ................. 713/178 |
| 7,814,534 | B2 | 10/2010 | Dillaway |
| 7,823,192 | B1 * | 10/2010 | Fultz et al. ................... 726/7 |
| 7,844,610 | B2 | 11/2010 | Hillis et al. |
| 2001/0018675 | A1 * | 8/2001 | Blaze et al. ................... 705/35 |
| 2002/0087859 | A1 | 7/2002 | Weeks et al. |
| 2003/0083877 | A1 | 5/2003 | Sugimoto |
| 2003/0110192 | A1 | 6/2003 | Valente et al. |

(Continued)

FOREIGN PATENT DOCUMENTS

WO    WO0056027    9/2000

OTHER PUBLICATIONS

Sye Loong Keoh et al, "Toward Flexible Credential Verification in Mobile Ad-hoc Networks", pp. 1-8, ACM 2002.*

(Continued)

*Primary Examiner* — David García Cervetti
*Assistant Examiner* — Shanto M Abedin
(74) *Attorney, Agent, or Firm* — Lee & Hayes, PLLC

(57) ABSTRACT

Security assertion revocation enables a revocation granularity in a security scheme down to the level of individual assertions. In an example implementation, a security token includes multiple respective assertions that are associated with multiple respective assertion identifiers. More specifically, each individual assertion is associated with at least one individual assertion identifier.

13 Claims, 9 Drawing Sheets

U.S. PATENT DOCUMENTS

| | | |
|---|---|---|
| 2003/0115292 A1 | 6/2003 | Griffin et al. |
| 2003/0120955 A1 | 6/2003 | Bartal et al. |
| 2003/0149714 A1* | 8/2003 | Casati et al. ............... 709/100 |
| 2003/0225697 A1 | 12/2003 | DeTreville |
| 2003/0229781 A1 | 12/2003 | Fox et al. |
| 2004/0024764 A1 | 2/2004 | Hsu et al. |
| 2004/0034770 A1* | 2/2004 | Kaler et al. ................. 713/155 |
| 2004/0064707 A1* | 4/2004 | McCann et al. ............. 713/185 |
| 2004/0122958 A1 | 6/2004 | Wardrop |
| 2004/0123154 A1 | 6/2004 | Lippman et al. |
| 2004/0128393 A1 | 7/2004 | Blakley, III et al. |
| 2004/0128546 A1 | 7/2004 | Blakley, III et al. |
| 2004/0139352 A1* | 7/2004 | Shewchuk et al. ........... 713/201 |
| 2004/0162985 A1* | 8/2004 | Freeman et al. ............. 713/176 |
| 2004/0181665 A1* | 9/2004 | Houser ........................ 713/158 |
| 2004/0221174 A1 | 11/2004 | Le Saint et al. |
| 2004/0243811 A1* | 12/2004 | Frisch et al. ................. 713/176 |
| 2004/0243835 A1 | 12/2004 | Terzis et al. |
| 2004/0250112 A1 | 12/2004 | Valente et al. |
| 2005/0015586 A1* | 1/2005 | Brickell ........................ 713/156 |
| 2005/0055363 A1 | 3/2005 | Mather |
| 2005/0066198 A1* | 3/2005 | Gelme et al. ................. 713/201 |
| 2005/0079866 A1 | 4/2005 | Chen et al. |
| 2005/0080766 A1 | 4/2005 | Ghatare |
| 2005/0097060 A1 | 5/2005 | Lee et al. |
| 2005/0108176 A1 | 5/2005 | Jarol et al. |
| 2005/0132220 A1 | 6/2005 | Chang et al. |
| 2005/0138357 A1 | 6/2005 | Swenson et al. |
| 2005/0187877 A1 | 8/2005 | Tadayon et al. |
| 2005/0188072 A1* | 8/2005 | Lee et al. ..................... 709/223 |
| 2005/0198326 A1* | 9/2005 | Schlimmer et al. .......... 709/229 |
| 2005/0220304 A1* | 10/2005 | Lenoir et al. ................. 380/255 |
| 2006/0005010 A1* | 1/2006 | Olsen et al. .................. 713/156 |
| 2006/0005227 A1 | 1/2006 | Samuelsson et al. |
| 2006/0015728 A1 | 1/2006 | Ballinger et al. |
| 2006/0026667 A1 | 2/2006 | Bhide et al. |
| 2006/0041421 A1 | 2/2006 | Ta et al. |
| 2006/0041929 A1 | 2/2006 | Della-Libera et al. |
| 2006/0048216 A1 | 3/2006 | Hinton et al. |
| 2006/0075469 A1* | 4/2006 | Vayman .......................... 726/2 |
| 2006/0106856 A1 | 5/2006 | Bermender et al. |
| 2006/0129817 A1 | 6/2006 | Borneman et al. |
| 2006/0136990 A1* | 6/2006 | Hinton et al. .................... 726/2 |
| 2006/0156391 A1* | 7/2006 | Salowey ............................ 726/5 |
| 2006/0195690 A1 | 8/2006 | Kostal et al. |
| 2006/0200664 A1 | 9/2006 | Whitehead et al. |
| 2006/0206707 A1 | 9/2006 | Kostal et al. |
| 2006/0206925 A1* | 9/2006 | Dillaway et al. .................. 726/5 |
| 2006/0206931 A1* | 9/2006 | Dillaway et al. .................. 726/9 |
| 2006/0225055 A1 | 10/2006 | Tieu |
| 2006/0230432 A1 | 10/2006 | Lee et al. |
| 2006/0236382 A1 | 10/2006 | Hinton et al. |
| 2006/0242162 A1 | 10/2006 | Conner et al. |
| 2006/0242688 A1 | 10/2006 | Paramasivam et al. |
| 2006/0259776 A1 | 11/2006 | Johnson et al. |
| 2006/0277595 A1* | 12/2006 | Kinser et al. ..................... 726/3 |
| 2007/0006284 A1* | 1/2007 | Adams et al. ..................... 726/4 |
| 2007/0043607 A1 | 2/2007 | Howard et al. |
| 2007/0055887 A1 | 3/2007 | Cross et al. |
| 2007/0056019 A1 | 3/2007 | Allen et al. |
| 2007/0061872 A1* | 3/2007 | Carter ................................ 726/4 |
| 2007/0143835 A1 | 6/2007 | Cameron et al. |
| 2007/0169172 A1* | 7/2007 | Backes et al. ..................... 726/2 |
| 2007/0199059 A1 | 8/2007 | Takehi |
| 2007/0283411 A1 | 12/2007 | Paramasivam et al. |
| 2007/0300285 A1* | 12/2007 | Fee et al. ........................... 726/1 |
| 2008/0066158 A1 | 3/2008 | Dillaway et al. |
| 2008/0066159 A1 | 3/2008 | Dillaway et al. |
| 2008/0066160 A1 | 3/2008 | Becker et al. |
| 2008/0066169 A1* | 3/2008 | Dillaway et al. .................. 726/9 |
| 2008/0097748 A1 | 4/2008 | Haley et al. |
| 2008/0127320 A1 | 5/2008 | De Lutiis et al. |
| 2008/0172721 A1 | 7/2008 | Noh et al. |

OTHER PUBLICATIONS

Phillip Hallam-Baker, "Web Services Security: SAML Token Profile", pp. 1-25, OASIS Open, 2002.*

Phillip Hallam-Baker, Security Assertion Markup Language Strawman Architecture, pp. 1-17 , VeriSign 2001.*

Jun Wang et al, Extending the Security Assertion Markup Language to Support Delegation for Web Services and Grid Services, pp. 1-8, IEEE 2005.*

Stephen Farrell et al, Assertions and Protocols for the OASIS Security Assertion Markup Language (SAML) V2.0, pp. 1-87, OASIS Open 2004.*

G. Navarro et al, "Constrained Delegation in XML-based Access Control and Digital Rights Management Standards", pp. 1-6, Communication, Network, and Information Security, 2003.*

D. W. Chadwick, an Authorisation Interface for the Grid, pp. 1-14, In E-Science All Hands Meeting 2003, Nottingham 2003.*

Joo-Young Lee et al, Security Assertion Exchange for the Agent on the Semantic Web, pp. 302-308, Proceedings of the IADIS International Conference, Madrid, 2004.*

Marlena Erdos et al, Shibboleth-Architecture Draft v04, pp. 1-39, Nov. 2001.*

Bindings for the OASIS Security Assertion Markup Language (SAML) V2.0, OASIS Standard , Mar. 15, 2005.

"Security Assertion Markup Language (SAML) 2.0 Technical Overview", OASIS, Working Draft 01, Jul. 22, 2004, pp. 1-36.

Cederquist et al., "An Audit Logic for Accountability", IEEE, 2005, pp#1-pp#10.

Hughs et al., "Security Assertion Markup Language (SAML) 2.0 Technical Overview", OASIS, 2004, pp#1-pp#36.

Ardagna, et al., "XML-based Access Control Languages ", Universita degli Studi di Milano, Italy, available at <<http://seclab.dti.unimi.it/Papers/RI-3.pdf>>, pp. 1-14.

Becker, et al., "Cassandra: Distributed Access Control Policies with Tunable Expressiveness", IEEE 5th International Workshop on Policies for Distributed Systems and Networks, 2004, pp. 159-168.

Becker, et al., "Cassandra: Flexible Trust Management, Applied to Electronic Health Records", IEEE Computer Security Foundations Workshop, 2004, pp. 139-154.

Blaze, et al., "Decentralized Trust Management", IEEE Symposium on Security and Privacy, 1996, pp. 164-173.

Blaze, et al., "The Role of Trust Management in Distributed Systems Security", Secure Internet Programming, 1999, pp. 185-210.

"eXtensible rights Markup Language (XrML) 2.0 Specificaton Part II: Core Schema", ContentGuard, available at <<www.xrml.org>>Nov. 20, 2001, 46 pages.

Damianou, et al., "Ponder: A Language for Specifying Security and Management Policies for Distributed Systems", Imperial College of Science, Technology and Medicine, London, U.K, Oct. 20, 2000, available at <<http://www.doc.ic.ac.uk/~ncd/policies/files/PonderSpec.pdf>>, pp. 1-49.

DeTreville, "Binder, A Logic-Based Security Language", IEEE Symposium on Security and Privacy, 2002, pp. 105-113.

Ellison, et al., "RFC 2693—SPKI Certificate Theory", available at <<http://www.ietf.org/rfc/rfc2693.txt>>, accessed on Sep. 27, 2006, 38 pages.

Halpern, et al., "Using First-Order Logic to Reason About Policies", IEEE Computer Security Foundations Workshop, 2003, available at <<http://arxiv.org/PS_cache/cs/pdf/0601/0601034.pdf>>, pp. 187-201.

Jim, "SD3: A Trust Management System with Certified Evaluation", Proceedings of the 2001 IEEE Symposium on Security and Privacy, 2001, available at <<http://www.research.att.com/~trevor/papers/JimOakland2001.pdf#search=%22%22SD3%3A%20A%20Trust%20Management%20System%20with%20Certified%20 Evaluation%22%22>>, pp. 106-115.

Li, et al., "A Practically Implementable and Tractable Delegation Logic", IEEE Symposium on Security and Privacy, 2000, available at <<http://www.cs.purdue.edu/homes/ninghui/papers/dl_oakland00.pdf>>, pp. 27-42.

Li, et al., "Datalog with Constraints: A Foundation for Trust Management Languages", Proc. PADL, 2003, available at <<http://www.cs.purdue.edu/homes/ninghui/papers/cdatalog_padl03/pdf#search=%22%22Datalog%20with%20Constraints%3A%20A%20Foundation%20For%20Trust%20Management%20Languages%22%22>>, pp. 58-73.

Li, et al., "Design of a Role-Based Trust Management Framework", Proceedings of the 2002 IEEE Symposium on Security and Privacy, 2002, available at <<http://www.cs.purdue.edu/homes/ninghui/papers/rt_oakland02.pdf#search=%22%22Design%20of%20a%20Role-Based%20Trust%20Management%20Framework%22%22>>, pp. 114-130.

"OASIS", Security Assertion Markup Language (SAML), accessed on Sep. 27, 2006 from <<www.oasis-open.org/committees/security>>, 8 pages.

"OASIS", eXtensible Access Control Markup Language (XACML) Version 2.0 Core Specification, 2005, accessed on Sep. 27, 2006 at <<www.oasis-open.org/committees/xacml/>>, 6 pages.

"RFC 3280—Internet X.409 Public Key Infrastructure Certificate and Certificate Revocation List (CRL) Profile", IETF, retrieved on Sep. 22, 2006 from <<http://www.faqs.org/rfcs/rfc3280.html>>, Apr. 2002, 8 pages.

Ribeiro, et al., "SPL: An access control language for security policies with comples constraints", retrieved at <<http://www.gsd.inesc-id.pt/~cnr/splii.pdf>>, IST/INESC, Portugal, pp. 1-22.

Rivest, et al., "SDSI—A Simple Distributed Security Infrastructure", available at <<http://theory.lcs.mit.edu/~rivest/sdsi10.ps>>, Apr. 30, 1996, pp. 1-37.

Wu, et al., "Evaluation of Authorization-Authentication Tools: PERMIS, OASIS, XACML, and SHIBOLETH", Technical Report CS-TR-935, University of Newcastle upon Tyne, 2005.

Dai et al., "Logic Based Authorization Policy Engineering", 2001, pp#1-pp#9.

Office Action from the U.S. Patent and Trademark Office for U.S. Appl. No. 11/530,433, mailed Mar. 1, 2009, 26 pages.

Office Action from the U.S. Patent and Trademark Office for U.S. Appl. No. 11/530,429, mailed on Mar. 2, 2010, 21 pages.

Office Action from the U.S. Patent and Trademark Office for U.S. Appl. No. 11/530,427, mailed Mar. 3, 2010, 26 pages.

Office Action from the U.S. Patent and Trademark Office for U.S. Appl. No. 11/530,446, mailed on Jul. 30, 2010, 29 pages.

Office Action from the U.S. Patent and Trademark Office for U.S. Appl. No. 11/530,446, mailed on Feb. 24, 2010, 30 pages.

Office Action from the U.S. Patent and Trademark Office for U.S. Appl. No. 11/530,439, mailed on Mar. 5, 2010, 32 pages.

Office Action from the U.S. Patent and Trademark Office for U.S. Appl. No. 11/530,438, mailed May 20, 2010, 35 pages.

Office Action from the U.S. Patent and Trademark Office for U.S. Appl. No. 11/530,543, mailed on Jul. 8, 2010, 12 pages.

Office Action from the U.S. Patent and Trademark Office for U.S. Appl. No. 11/530,427, mailed on Aug. 20, 2010, 23 pages.

Office Action from the U.S. Patent and Trademark Office for U.S. Appl. No. 11/530,429, mailed on Aug. 20, 2009, 24 pages.

Office Action from the U.S. Patent and Trademark Office for U.S. Appl. No. 11/530,433, mailed on Aug. 21, 2009, 24 pages.

Office Action from the U.S. Patent and Trademark Office for U.S. Appl. No. 11/530,556, mailed on Aug. 23, 2010, 14pages.

Office Action from the U.S. Patent and Trademark Office for U.S. Appl. No. 11/530,564, mailed on Sep. 15, 2010, 17 pages.

Notice of Allowance from the U.S. Patent and Trademark Office for U.S. Appl. No. 11/530,439, mailed Aug. 23, 2010, 22 pages.

Pfenning et al., "System Description: Twelf—A Meta-Logical Framework for Deductive Systems", 1999, pp#1-pp#5.

Stoller, "Trust Management A Tutorial", Stony Brook University, State University of New York, May 2006, pp#1-pp#118.

Whitehead et al., "By Reason and Authority: A System for Authorization of Proof-Carrying Code", IEEE Computer Secuirty Foundations Workshop (CSFW'04) 2004, pp#1-pp#15.

Translated Chinese Office Action mailed Jan. 26, 2011 for Chinese Patent Application No. 200780033359.7, a counterpart foreign application for U.S. Appl. No. 11/530,446, 8 pages.

Office Action from the U.S. Patent and Trademark Office for U.S. Appl. No. 11/530,438, mailed Oct. 29, 2010, 31 pages.

Office Action from the U.S. Patent and Trademark Office for U.S. Appl. No. 11/530,543, mailed on Dec. 27, 2010, 17 pgs.

Office Action from the U.S. Patent and Trademark Office for U.S. Appl. No. 11/530,429, mailed on Jan. 19, 2011, 34 pgs.

Office Action from the U.S. Patent and Trademark Office for U.S. Appl. No. 11/530,427, mailed on Dec. 23, 2010, 33 pages.

Office Action from the U.S. Patent and Trademark Office for U.S. Appl. No. 11/530,446 mailed on Feb. 3, 2011, 35 pages.

Chapin, et al., "Risk Assessment in Distributed Authorization", In the Proceedings of the 2005 ACM Workshop on Formal Methods in Security Engineering, Nov. 2005, pp. 33-41.

Translated Chinese Notice of Grant of Patent Right for Invention mailed Mar. 25, 2011 for Chinese Patent Application No. 200780033322.4 a counterpart foreign application for U.S. Appl. No. 11/530,438, 4 pages.

DeTreville, "Binder, a Logic-Based Security Language", IEEE Computer Society, In the Proceedings of the 2002 IEEE Symposium on Security and Privacy, Mar. 2002, 10 pgs.

The Extended European Search Report mailed Jul. 22, 2011 for European patent application No. 07842066.8, 8 pages.

Office Action from the U.S. Patent and Trademark Office for U.S. Appl. No. 11/530,556 mailed on Feb. 4, 2011, 8 pages.

Kagal, et al., "Trust-Based Security in Pervasive Computing Environments", IEEE Computer, Dec. 1, 2001, vol. 34, No. 12, 4 pages.

Office Action from the U.S. Patent and Trademark Office for U.S. Appl. No. 11/530,433 mailed on Jan. 18, 2011, 22 pages.

Notice of Allowance from the U.S. Patent and Trademark Office for U.S. Appl. No. 11/530,438, mailed Apr. 4, 2011, 8 pages.

Office Action for U.S. Appl. No. 11/530,564, mailed on Apr. 12, 2011, Moritz Becker, "Security Language Expressions for Logic Resolution", 8 pages.

Final Office Action for U.S. Appl. No. 11/530,427, mailed on Jun. 29, 2011, Blair B. Dillaway, "Variable Expressions in Security Assertions", 19 pages.

Final Office Action for U.S. Appl. No. 11/530,429, mailed on Jul. 8, 2011, Blair B. Dillaway, "Authorization Decisions with Principal Attributes", 20 pages.

Final Office Action for U.S. Appl. No. 11/530,433, mailed on Jul. 8, 2011, Blair B. Dillaway, "Fact Qualifiers in Security Scenarios", 18 pages.

Office Action for U.S. Appl. No. 12/902,892, mailed on Aug. 5, 2011, Blair B. Dillaway, "Auditing Authorization Decisions", 18 pages.

Upadhyay, et al., "Generic Security Service API Version 2: Java Bindings Update: draft-ietf-kitten-rfc2853bis-01.txt", IETF Standard-Working-Draft, Internet Engineering Task Force, IETF, CH, vol. kitten, No. 1, Jan. 27, 2006, 102 pages.

Wainer, et al., "A Fine-Grained, Controllable, User-to-User Delegatino Method in RBAC", Proceedings of the Tenth ACM Symposium on Access Control Models and Technologies, SACMAT, Jan. 1, 2005, pp. 59-66.

Yin, et al., "A Rule-based Framework for Role0based Constrained Delegation", Proceedings of the 3rd International Conference on Information Security, INFOSECU, Jan. 1, 2004, pp. 186-191.

Advisory Action for U.S. Appl. No. 11/530,427, mailed on Sep. 26, 2011, Blair B. Dillaway, "Variable Expressions in Security Assertions", 4 pages.

Advisory Action for U.S. Appl. No. 11/530,433, mailed on Sep. 27, 2011, Blair B. Dillaway, "Fact Qualifiers in Security Scenarios", 3 pages.

Non-Final Office Action for U.S. Appl. No. 11/530,446, mailed on Sep. 15, 2011, Blair B. Dillaway, "Controlling the Delegation of Rights", 30 pages.

Chinese Office Action mailed Aug. 25, 2011 for Chinese patent application No. 200780033359.7, a counterpart foreign application of U.S. Appl. No. 11/530,446, 15 pages.

ContentGuard, "eXtensibe rights Markup Language (XrML) 2.0 Specification Part 1: Primer", Nov. 20, 2001, pp. 1-39.

* cited by examiner

Example Assertion Format

SECURITY ASSERTION REVOCATION

BACKGROUND

Computers and other electronic devices are pervasive in the professional and personal lives of people. In professional settings, people exchange and share confidential information during project collaborations. In personal settings, people engage in electronic commerce and the transmission of private information. In these and many other instances, electronic security is deemed to be important.

Electronic security paradigms can keep professional information confidential and personal information private. Electronic security paradigms may involve some level of encryption and/or protection against malware, such as viruses, worms, and spyware. Both encryption of information and protection from malware have historically received significant attention, especially in the last few years.

However, controlling access to information is an equally important aspect of securing the safety of electronic information. This is particularly true for scenarios in which benefits are derived from the sharing and/or transferring of electronic information. In such scenarios, certain people are to be granted access while others are to be excluded.

Access control has been a common feature of shared computers and application servers since the early time-shared systems. There are a number of different approaches that have been used to control access to information. They share a common foundation in combining authentication of the entity requesting access to some resource with a mechanism of authorizing the allowed access. Authentication mechanisms include passwords, Kerberos, and x.509 certificates. Their purpose is to allow a resource-controlling entity to positively identify the requesting entity or information about the entity that it requires.

Authorization examples include access control lists (ACLs) and policy-based mechanisms such as the eXtensible Access Control Markup Language (XACML) or the PrivilEge and Role Management Infrastructure (PERMIS). These mechanisms define what entities may access a given resource, such as files in a file system, hardware devices, database information, and so forth. They perform this authorization by providing a mapping between authenticated information about a requestor and the allowed access to a resource.

As computer systems have become more universally connected over large networks such as the Internet, these mechanisms have proven to be somewhat limited and inflexible in dealing with evolving access control requirements. Systems of geographically dispersed users and computer resources, including those that span multiple administrative domains, in particular present a number of challenges that are poorly addressed by currently-deployed technology.

SUMMARY

Security assertion revocation enables a revocation granularity in a security scheme down to the level of individual assertions. In an example implementation, a security token includes multiple respective assertions that are associated with multiple respective assertion identifiers. More specifically, each individual assertion is associated with at least one individual assertion identifier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, protocol, etc. implementations are described herein.

BRIEF DESCRIPTION OF THE DRAWINGS

The same numbers are used throughout the drawings to reference like and/or corresponding aspects, features) and components.

DETAILED DESCRIPTION

Example Security Environments

Figure 1:
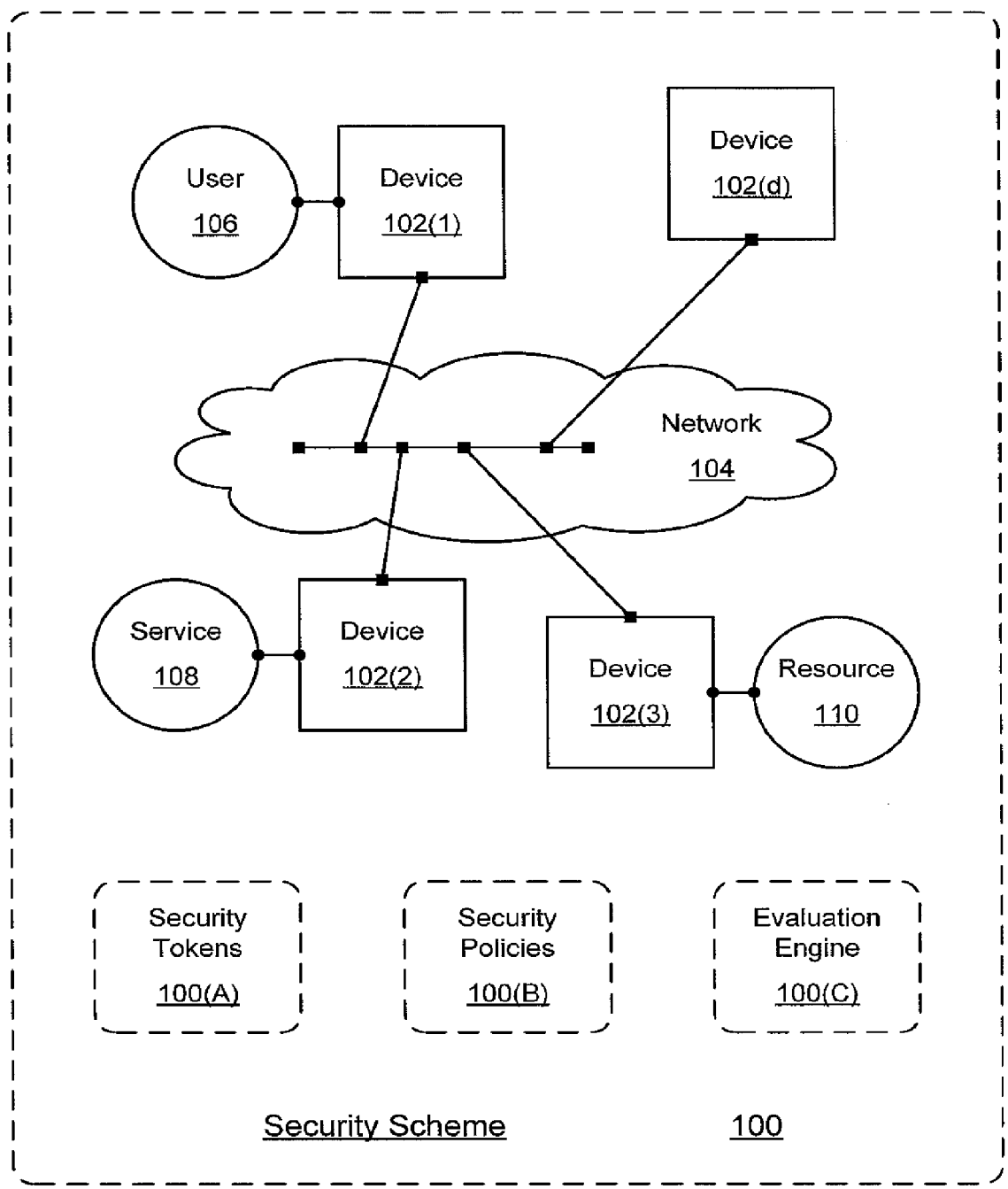
FIG. 1 is a block diagram illustrating an example general environment in which an example security scheme may be implemented.

FIG. 1 is a block diagram illustrating an example general environment in which an example security scheme 100 may be implemented. Security scheme 100 represents an integrated approach to security. As illustrated, security scheme 100 includes a number of security concepts: security tokens 100(A), security policies 100(B), and an evaluation engine 100(C). Generally, security tokens 100(A) and security policies 100(B) jointly provide inputs to evaluation engine 100 (C). Evaluation engine 100(C) accepts the inputs and produces an authorization output that indicates if access to some resource should be permitted or denied.

In a described implementation, security scheme 100 can be overlaid and/or integrated with one or more devices 102, which can be comprised of hardware, software, firmware, some combination thereof, and so forth. As illustrated, "d" devices, with "d" being some integer, are interconnected over one or more networks 104. More specifically, device 102(1), device 102(2), device 102(3) . . . device 102(d) are capable of communicating over network 104.

Each device 102 may be any device that is capable of implementing at least a part of security scheme 100. Examples of such devices include, but are not limited to, computers (e.g., a client computer, a server computer, a personal computer, a workstation, a desktop, a laptop, a palmtop, etc.), game machines (e.g., a console, a portable game device, etc.), set-top boxes, televisions, consumer electronics (e.g., DVD player/recorders, camcorders, digital video recorders (DVRs), etc.), personal digital assistants (PDAs), mobile phones, portable media players, some combination thereof, and so forth. An example electronic device is described herein below with particular reference to FIG. 4.

Network 104 may be formed from any one or more networks that are linked together and/or overlaid on top of each other. Examples of networks 104 include, but are not limited to, an internet, a telephone network, an Ethernet, a local area network (LAN), a wide area network (WAN), a cable network, a fibre network, a digital subscriber line (DSL) network, a cellular network, a Wi-Fi® network, a WiMAX® network, a virtual private network (VPN), some combination thereof, and so forth. Network 104 may include multiple domains, one or more grid networks, and so forth. Each of these networks or combination of networks may be operating in accordance with any networking standard.

As illustrated, device 102(1) corresponds to a user 106 that is interacting with it. Device 102(2) corresponds to a service 108 that is executing on it. Device 102(3) is associated with a resource 110. Resource 110 may be part of device 102(3) or separate from device 102(3).

User 106, service 108, and a machine such as any given device 102 form a non-exhaustive list of example entities. Entities, from time to time, may wish to access resource 110. Security scheme 100 ensures that entities that are properly authenticated and authorized are permitted to access resource 110 while other entities are prevented from accessing resource 110.

Figure 2:
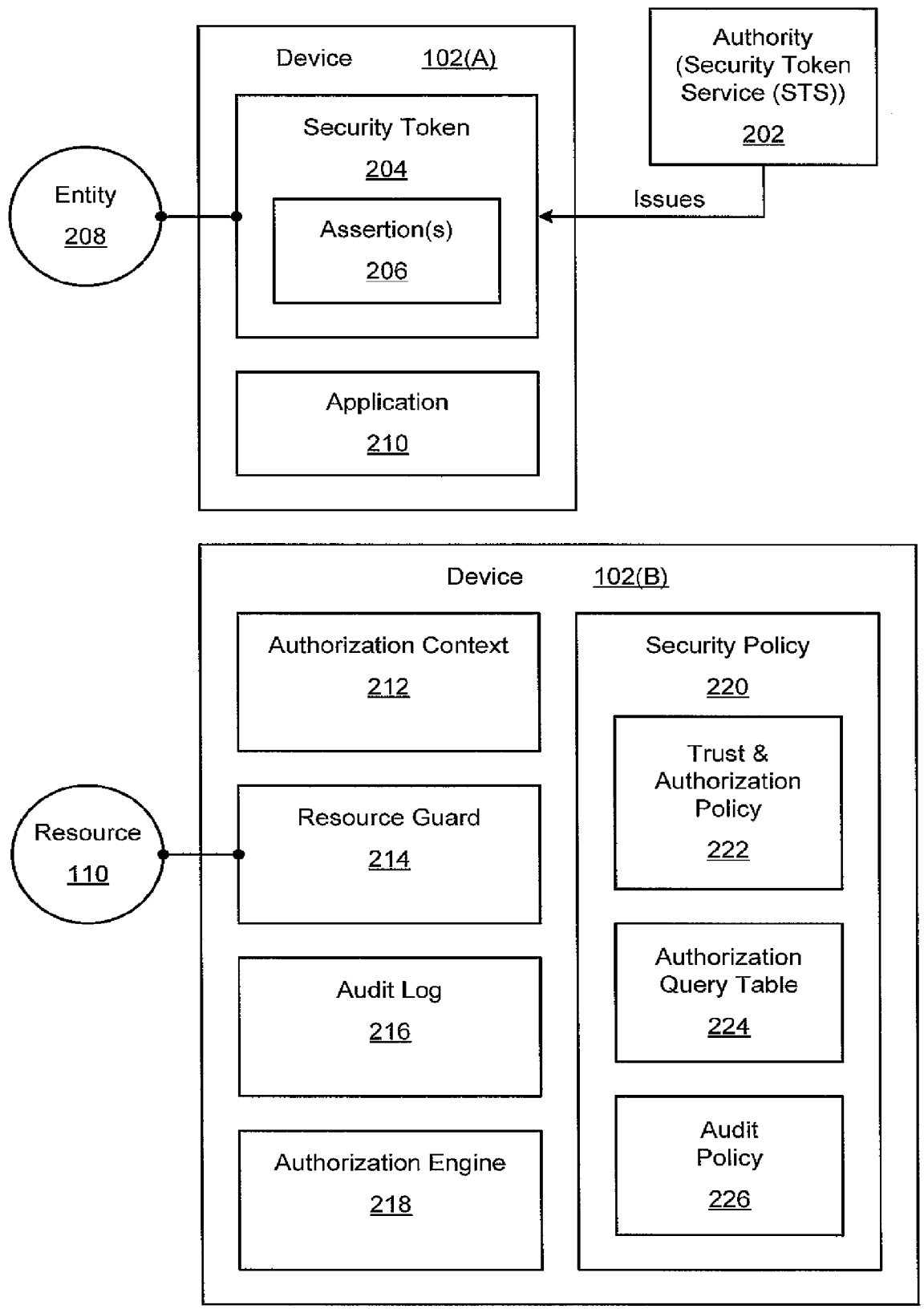
FIG. 2 is a block diagram illustrating an example security environment having two devices and a number of example security-related components.

FIG. 2 is a block diagram illustrating an example security environment 200 having two devices 102(A) and 102(B) and a number of example security-related components. Security environment 200 also includes an authority 202, such as a security token service (STS) authority. Device 102(A) corresponds to an entity 208. Device 102(B) is associated with resource 110. Although a security scheme 100 may be implemented in more complex environments, this relatively-simple two-device security environment 200 is used to describe example security-related components.

As illustrated device 102(A) includes two security-related components: a security token 204 and an application 210. Security token 204 includes one or more assertions 206. Device 102(B) includes five security-related components: an authorization context 212, a resource guard 214, an audit log 216, an authorization engine 218, and a security policy 220. Security policy 220 includes a trust and authorization policy 222, an authorization query table 224, and an audit policy 226.

Each device 102 may be configured differently and still be capable of implementing all or a part of security scheme 100. For example, device 102(A) may have multiple security tokens 204 and/or applications 210. As another example, device 102(B) may not include an audit log 216 or an audit policy 226. Other configurations are also possible.

In a described implementation, authority 202 issues security token 204 having assertions 206 to entity 208. Assertions 206 are described herein below, including in the section entitled "Security Policy Assertion Language Example Characteristics". Entity 208 is therefore associated with security token 204. In operation, entity 208 wishes to use application 210 to access resource 110 by virtue of security token 204.

Resource guard 214 receives requests to access resource 110 and effectively manages the authentication and authorization process with the other security-related components of device 102(B). Trust and authorization policy 222, as its name implies, includes policies directed to trusting entities and authorizing actions within security environment 200. Trust and authorization policy 222 may include, for example, security policy assertions (not explicitly shown in FIG. 2). Authorization query table 224 maps requested actions, such as access requests, to an appropriate authorization query. Audit policy 226 delineates audit responsibilities and audit tasks related to implementing security scheme 100 in security environment 200.

Authorization context 212 collects assertions 206 from security token 204, which is/are used to authenticate the requesting entity, and security policy assertions from trust and authorization policy 222. These collected assertions in authorization context 212 form an assertion context. Hence, authorization context 212 may include other information in addition to the various assertions.

The assertion context from authorization context 212 and an authorization query from authorization query table 224 are provided to authorization engine 218. Using the assertion context and the authorization query, authorization engine 218 makes an authorization decision. Resource guard 214 responds to the access request based on the authorization decision. Audit log 216 contains audit information such as, for example, identification of the requested resource 110 and/or the algorithmic evaluation logic performed by authorization engine 218.

Figure 3:
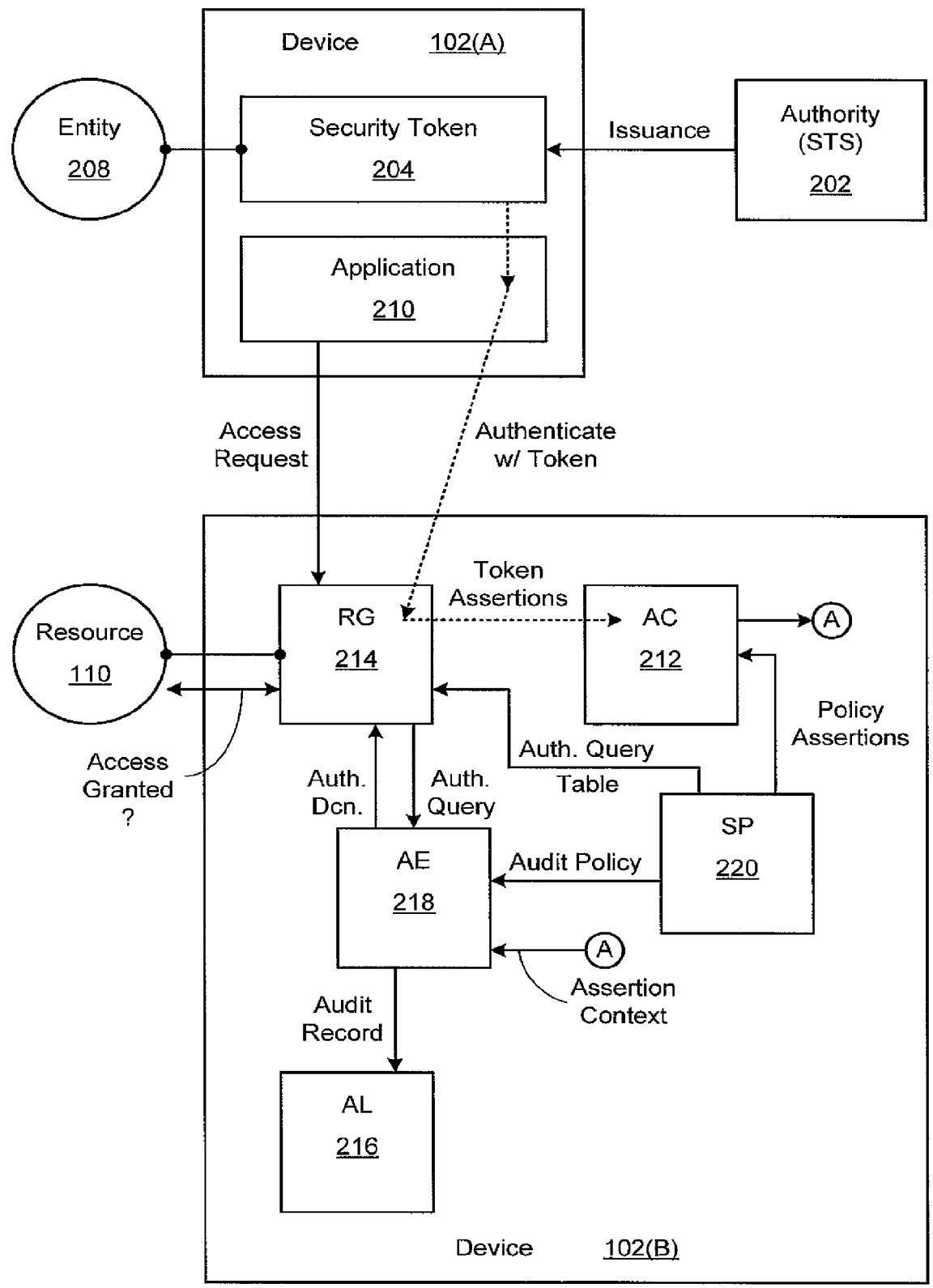
FIG. 3 is a block diagram illustrating the example security environment of FIG. 2 in which example security-related data is exchanged among the security-related components.

FIG. 3 is a block diagram illustrating example security environment 200 in which example security-related data is exchanged among the security-related components. The security-related data is exchanged in support of an example access request operation. In this example access request operation, entity 208 wishes to access resource 110 using application 210 and indicates its authorization to do so with security token 204. Hence, application 210 sends an access request* to resource guard 214. In this description of FIG. 3, an asterisk (i.e., "*") indicates that the stated security-related data is explicitly indicated in FIG. 3.

In a described implementation, entity 208 authenticates* itself to resource guard 214 with a token*, security token 204. Resource guard 214 forwards the token assertions* to authorization context 212. These token assertions are assertions 206 (of FIG. 2) of security token 204. Security policy 220 provides the authorization query table* to resource guard 214. The authorization query table derives from authorization query table module 224. The authorization query table sent to resource guard 214 may be confined to the portion or portions directly related to the current access request.

Policy assertions are extracted from trust and authorization policy 222 by security policy 220. The policy assertions may include both trust-related assertions and authorization-related assertions. Security policy 220 forwards the policy assertions* to authorization context 212. Authorization context 212 combines the token assertions and the policy assertions into an assertion context. The assertion context* is provided from authorization context 212 to authorization engine 218 as indicated by the encircled "A".

An authorization query is ascertained from the authorization query table. Resource guard 214 provides the authorization query (auth. query*) to authorization engine 218. Authorization engine 218 uses the authorization query and the assertion context in an evaluation algorithm to produce an authorization decision. The authorization decision (auth. dcn.*) is returned to resource guard 214. Whether entity 208 is granted access* to resource 110 by resource guard 214 is dependent on the authorization decision. If the authorization decision is affirmative, then access is granted. If, on the other hand, the authorization decision issued by authorization engine 218 is negative, then resource guard 214 does not grant entity 208 access to resource 110.

The authorization process can also be audited using semantics that are complementary to the authorization process. The auditing may entail monitoring of the authorization process and/or the storage of any intermediate and/or final products of, e.g., the evaluation algorithm logically performed by authorization engine 218. To that end, security policy 220 provides to authorization engine 218 an audit policy* from audit policy 226. At least when auditing is requested, an audit record* having audit information may be forwarded from authorization engine 218 to audit log 216. Alternatively, audit information may be routed to audit log 216 via resource guard 214, for example, as part of the authorization decision or separately.

Figure 4:
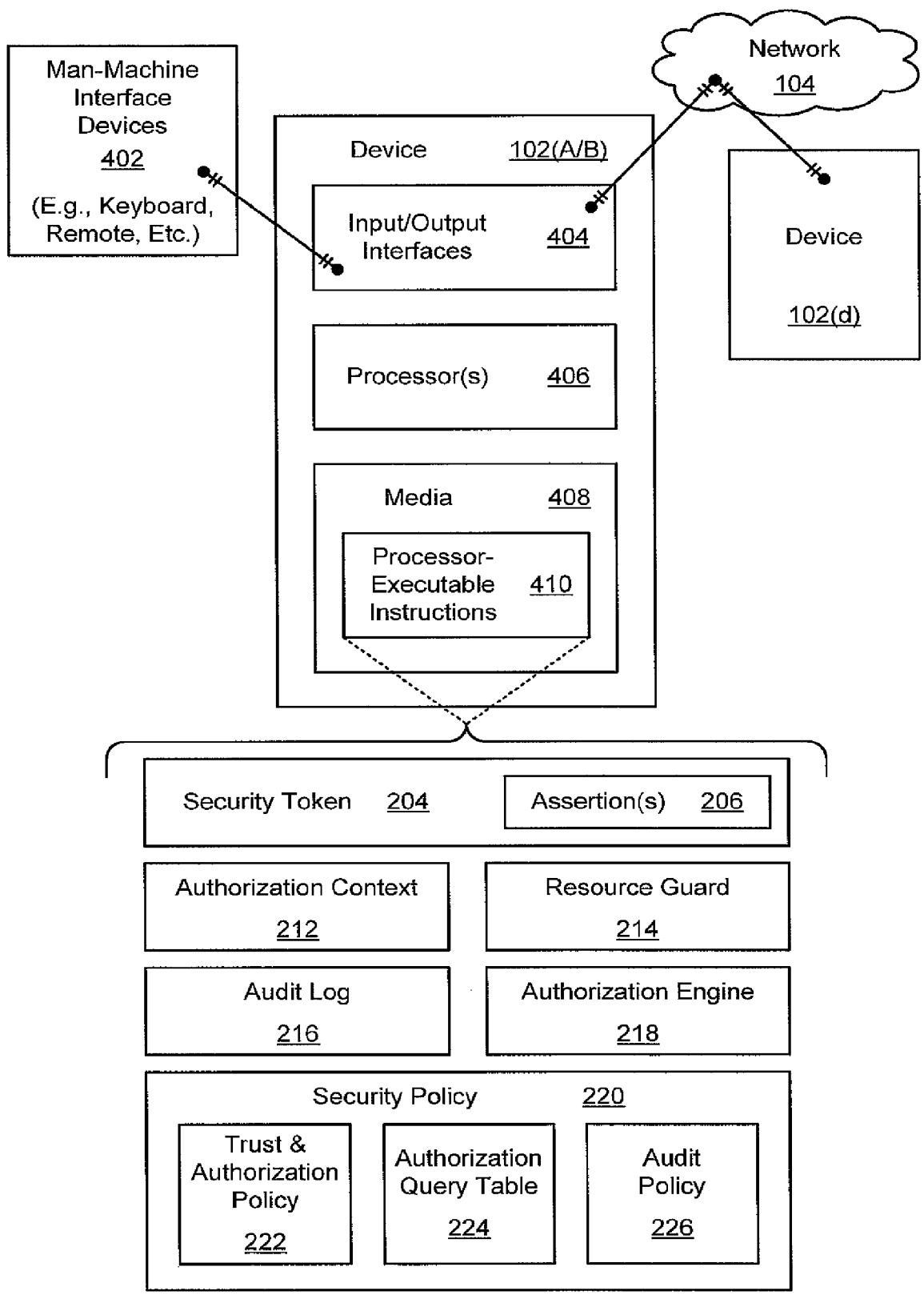
FIG. 4 is a block diagram of an example device that may be used for security-related implementations as described herein.

FIG. 4 is a block diagram of an example device 102 that may be used for security-related implementations as described herein. Multiple devices 102 are capable of communicating across one or more networks 104. As illustrated, two devices 102(A/B) and 102(d) are capable of engaging in communication exchanges via network 104. Although two devices 102 are specifically shown, one or more than two devices 102 may be employed, depending on the implementation.

Generally, a device 102 may represent any computer or processing-capable device, such as a client or server device; a workstation or other general computer device; a PDA; a mobile phone; a gaming platform; an entertainment device; one of the devices listed above with reference to FIG. 1; some combination thereof; and so forth. As illustrated, device 102 includes one or more input/output (I/O) interfaces 404, at least one processor 406, and one or more media 408. Media 408 include processor-executable instructions 410.

In a described implementation of device 102, I/O interfaces 404 may include (i) a network interface for communicating across network 104, (ii) a display device interface for displaying information on a display screen, (iii) one or more man-machine interfaces, and so forth. Examples of (i) network interfaces include a network card, a modem, one or more ports, and so forth. Examples of (ii) display device interfaces include a graphics driver, a graphics card, a hardware or software driver for a screen or monitor, and so forth. Printing device interfaces may similarly be included as part of I/O interfaces 404. Examples of (iii) man-machine interfaces include those that communicate by wire or wirelessly to man-machine interface devices 402 (e.g., a keyboard, a remote, a mouse or other graphical pointing device, etc.).

Generally, processor 406 is capable of executing, performing, and/or otherwise effectuating processor-executable instructions, such as processor-executable instructions 410. Media 408 is comprised of one or more processor-accessible media. In other words, media 408 may include processor-executable instructions 410 that are executable by processor 406 to effectuate the performance of functions by device 102.

Thus, realizations for security-related implementations may be described in the general context of processor-executable instructions. Generally, processor-executable instructions include routines, programs, applications, coding, modules, protocols, objects, components, metadata and definitions thereof, data structures, application programming interfaces (APIs), schema, etc. that perform and/or enable particular tasks and/or implement particular abstract data types. Processor-executable instructions may be located in separate storage media, executed by different processors, and/or propagated over or extant on various transmission media.

Processor(s) 406 may be implemented using any applicable processing-capable technology. Media 408 may be any available media that is included as part of and/or accessible by device 102. It includes volatile and non-volatile media, removable and non-removable media, and storage and transmission media (e.g., wireless or wired communication channels). For example, media 408 may include an array of disks/flash memory/optical media for longer-term mass storage of processor-executable instructions 410, random access memory (RAM) for shorter-term storing of instructions that are currently being executed, link(s) on network 104 for transmitting communications (e.g., security-related data), and so forth.

As specifically illustrated, media 408 comprises at least processor-executable instructions 410. Generally, processor-executable instructions 410, when executed by processor 406, enable device 102 to perform the various functions described herein, including those actions that are illustrated in the various flow diagrams. By way of example only, processor-executable instructions 410 may include a security token 204, at least one of its assertions 206, an authorization context module 212, a resource guard 214, an audit log 216, an authorization engine 218, a security policy 220 (e.g., a trust and authorization policy 222, an authorization query table 224, and/or an audit policy 226, etc.), some combination thereof; and so forth. Although not explicitly shown in FIG. 4, processor-executable instructions 410 may also include an application 210 and/or a resource 110.

Security Policy Assertion Language Example Characteristics

This section describes example characteristics of an implementation of a security policy assertion language (SecPAL). The SecPAL implementation of this section is described in a relatively informal manner and by way of example only. It has an ability to address a wide spectrum of security policy and security token obligations involved in creating an end-to-end solution. These security policy and security token obligations include, by way of example but not limitation: describing explicit trust relationships; expressing security token issuance policies; providing security tokens containing identities, attributes, capabilities, and/or delegation policies; expressing resource authorization and delegation policies; and so forth.

In a described implementation SecPAL is a declarative, logic-based language for expressing security in a flexible and tractable manner. It can be comprehensive, and it can provide a uniform mechanism for expressing trust relationships, authorization policies, delegation policies, identity and attribute assertions, capability assertions, revocations, audit requirements, and so forth. This uniformity provides tangible benefits in terms of making the security scheme understandable and analyzable. The uniform mechanism also improves security assurance by allowing one to avoid, or at least significantly curtail, the need for semantic translation and reconciliation between disparate security technologies.

A SecPAL implementation may include any of the following example features: [1] SecPAL can be relatively easy to understand. It may use a definitional syntax that allows its assertions to be read as English-language sentences. Also, its grammar may be restrictive such that it requires users to understand only a few subject-verb-object (e.g., subject-verb phrase) constructs with cleanly defined semantics. Finally, the algorithm for evaluating the deducible facts based on a collection of assertions may rely on a small number of relatively simple rules.

[2] SecPAL can leverage industry standard infrastructure in its implementation to ease its adoption and integration into existing systems. For example, an extensible markup language (XML) syntax may be used that is a straightforward mapping from the formal model. This enables use of standard parsers and syntactic correctness validation tools. It also allows use of the W3C XML Digital Signature and Encryption standards for integrity, proof of origin, and confidentiality.

[3] SecPAL may enable distributed policy management by supporting distributed policy authoring and composition. This allows flexible adaptation to different operational models governing where policies, or portions of policies, are authored based on assigned administrative duties. Use of standard approaches to digitally signing and encrypting policy objects allow for their secure distribution. [4] SecPAL enables an efficient and safe evaluation. Simple syntactic checks on the inputs are sufficient to ensure evaluations will terminate and produce correct answers.

[5] SecPAL can provide a complete solution for access control requirements supporting required policies, authorization decisions, auditing, and a public-key infrastructure (PKI) for identity management. In contrast, most other approaches only manage to focus on and address one subset of the spectrum of security issues. [6] SecPAL may be sufficiently expressive for a number of purposes, including, but not limited to, handling the security issues for Grid environments and other types of distributed systems. Extensibility is enabled in ways that maintain the language semantics and evaluation properties while allowing adaptation to the needs of specific systems.

Figure 5:
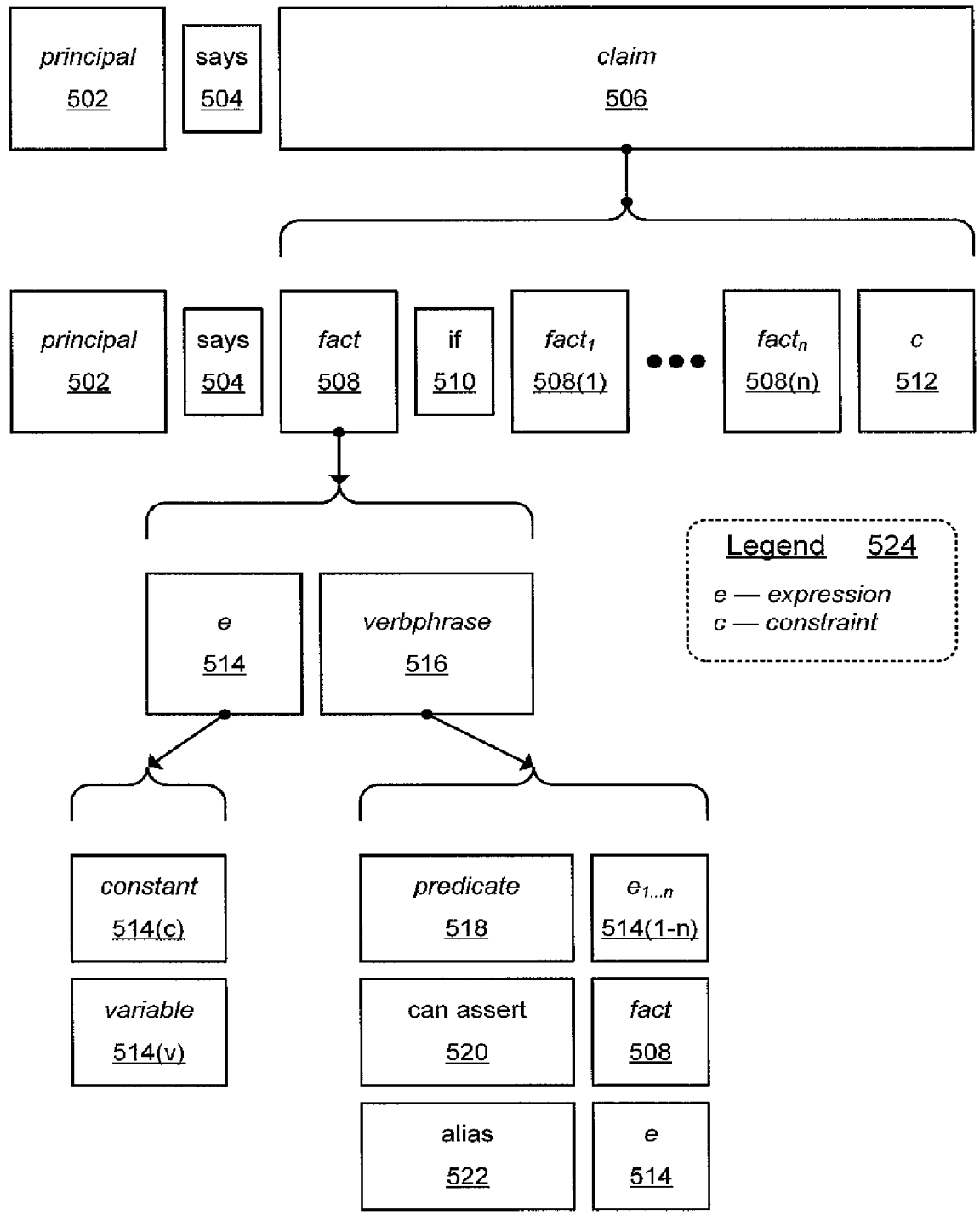
FIG. 5 is a block diagram illustrating an example assertion format for a general security scheme.

FIG. 5 is a block diagram illustrating an example assertion format 500 for a general security scheme. Security scheme assertions that are used in the implementations described otherwise herein may differ from example assertion format 500. However, assertion format 500 is a basic illustration of one example format for security scheme assertions, and it provides a basis for understanding example described implementation of various aspects of a general security scheme.

As illustrated at the top row of assertion format 500, an example assertion at a broad level includes: a principal portion 502, a says portion 504, and a claim portion 506. Textually, the broad level of assertion format 500 may be represented by: principal says claim.

At the next row of assertion format 500, claim portion 506 is separated into example constituent parts. Hence, an example claim portion 506 includes: a fact portion 508, an if portion 510, "n" conditional $fact_{1 \ldots n}$ portions 508(1 ... n), and a c portion 512. The subscript "n" represents some integer value. As indicated by legend 524, c portion 512 represents a constraint portion. Although only a single constraint is illustrated, c portion 512 may actually represent multiple constraints (e.g., $c_1, \ldots, c_m$). The set of conditional fact portions 508(1 ... n) and constraints 512(1 ... m) on the right-hand side of if portion 510 may be termed the antecedent.

Textually, claim portion 506 may be represented by: fact if $fact_1, \ldots, fact_n$, c. Hence, the overall assertion format 500 may be represented textually as follows: principal says fact if $fact_1, \ldots, fact_n$, c. However, an assertion may be as simple as: principal says fact. In this abbreviated, three-part version of an assertion, the conditional portion that starts with if portion 510 and extends to c portion 512 is omitted.

Each fact portion 508 may also be further subdivided into its constituent parts. Example constituent parts are: an e portion 514 and a verb phrase portion 516. As indicated by legend 524, e portion 514 represents an expression portion. Textually, a fact portion 508 may be represented by: e verbphrase.

Each e or expression portion 514 may take on one of two example options. These two example expression options are: a constant 514(c) and a variable 514(v). Principals may fall under constants 514(c) and/or variables 514(v).

Each verb phrase portion 516 may also take on one of three example options. These three example verb phrase options are: a predicate portion 518 followed by one or more $e_{1 \ldots n}$ portions 514(1 ... n), a can assert portion 520 followed by a fact portion 508, and an alias portion 522 followed by an expression portion 514. Textually, these three verb phrase options may be represented by: predicate $e_1 \ldots e_n$, can assert fact, and alias e, respectively. The integer "n" may take different values for facts 508(1 ... n) and expressions 514(1 ... n).

Generally, SecPAL statements are in the form of assertions made by a security principal. Security principals are typically identified by cryptographic keys so that they can be authenticated across system boundaries. In their simplest form, an assertion states that the principal believes a fact is valid (e.g., as represented by a claim 506 that includes a fact portion 508). They may also state a fact is valid if one or more other facts are valid and some set of conditions are satisfied (e.g., as represented by a claim 506 that extends from a fact portion 508 to an if portion 510 to conditional fact portions 508(1 ... n) to a c portion 512). There may also be conditional facts 508(1 ... n) without any constraints 512 and/or constraints 512 without any conditional facts 508(1 ... n).

In a described implementation, facts are statements about a principal. Four example types of fact statements are described here in this section. First, a fact can state that a principal has the right to exercise an action(s) on a resource with an "action verb". Example action verbs include, but are not limited to, call, send, read, list, execute, write, modify, append, delete, install, own, and so forth. Resources may be identified by universal resource indicators (URIs) or any other approach.

Second, a fact can express the binding between a principal identifier and one or more attribute(s) using the "possess" verb. Example attributes include, but are not limited to, email name, common name, group name, role title, account name, domain name server/service (DNS) name, internet protocol (IP) address, device name, application name, organization name, service name, account identification/identifier (ID), and so forth. An example third type of fact is that two principal identifiers can be defined to represent the same principal using the "alias" verb.

"Qualifiers" or fact qualifiers may be included as part of any of the above three fact types. Qualifiers enable an assertor to indicate environmental parameters (e.g., time, principal location, etc.) that it believes should hold if the fact is to be considered valid. Such statements may be cleanly separated between the assertor and a relying party's validity checks based on these qualifier values.

An example fourth type of fact is defined by the "can assert" verb. This "can assert" verb provides a flexible and powerful mechanism for expressing trust relationships and delegations. For example, it allows one principal (A) to state its willingness to believe certain types of facts asserted by a second principal (B). For instance, given the assertions "A says B can assert fact0" and "B says fact0", it can be concluded that A believes fact0 to be valid and therefore it can be deduced that "A says fact0".

Such trust and delegation assertions may be (i) unbounded and transitive to permit downstream delegation or (ii) bounded to preclude downstream delegation. Although qualifiers can be applied to "can assert" type facts, omitting support for qualifiers to these "can assert" type facts can significantly simplify the semantics and evaluation safety properties of a given security scheme.

In a described implementation, concrete facts can be stated, or policy expressions may be written using variables.

The variables are typed and may either be unrestricted (e.g., allowed to match any concrete value of the correct type) or restricted (e.g., required to match a subset of concrete values based on a specified pattern).

Security authorization decisions are based on an evaluation algorithm (e.g., that may be conducted at authorization engine 218) of an authorization query against a collection of assertions (e.g., an assertion context) from applicable security policies (e.g., a security policy 220) and security tokens (e.g., one or more security tokens 204). Authorization queries are logical expressions, which may become quite complex, that combine facts and/or conditions. These logical expressions may include, for example, AND, OR, and/or NOT logical operations on facts, either with or without attendant conditions and/or constraints.

This approach to authorization queries provides a flexible mechanism for defining what must be known and valid before a given action is authorized. Query templates (e.g., from authorization query table 224) form a part of the overall security scheme and allow the appropriate authorization query to be declaratively stated for different types of access requests and other operations/actions.

Example Implementations for Security Assertion Revocation

Especially in distributed computing environments, effective revocation mechanisms can be beneficial. In distributed systems, there may be no central authority that can effectively respond to changes, such as an employee leaving a company, login credentials being compromised, long-term identity cryptographic keys being compromised, and so forth. Even when such a central authority exists, it is typically very costly and time consuming to identify all security policies that authorize actions based on a credential (e.g., a security token, a certificate, some combination thereof, etc.) that should no longer be accepted. When such events occur, it is important to be able to block the use of existing credentials for a wide variety of purposes in a timely fashion. An approach to achieving this is the dissemination of revocation information to each of the widely deployed systems that might possibly rely on such questionable credentials.

Existing mechanisms for dealing with the revocation of security information are limiting in several ways. For example, many systems (e.g., Kerberos and SAML) fail to even define how revocation is to be handled. Instead, organizations relying on these technologies commonly require relatively short-lived credentials (e.g., an expiration period of 8 to 24 hours is common). When a security critical action occurs that affects the use of such credentials, organizations rely on the credentials expiring rather than having to do a revocation. This approach avoids the need for revocation but at the cost of a substantial 'window of vulnerability'.

Where the cost of acquiring credentials is high, as is common with x.509 certificates, one of several standardized revocation mechanisms is used. These mechanisms include Certificate Revocation Lists (CRLs) and On-Line Certificate Status Protocol (OCSP) messages. CRLs contain information about known revoked x.509 certificates at a particular time. OCSP messages allow one to ask about the status of a specific x.509 certificate.

However, these existing mechanisms are very coarse-grained and only operate at the level of complete certificates. They do not include any mechanism for revoking only a subset of the information in such a certificate. This coarseness results in several practical problems: access may have to be denied in far more places than necessary; re-certifications using new tokens and keys must be performed far more frequently than necessary; and/or trust relationships are broadly negated and must be re-negotiated using new tokens and keys.

In contrast, certain implementations as described herein enable a fine-grained revocation mechanism. This fine-grained revocation mechanism allows individual security assertions to be revoked by the assertor or their delegate.

Figure 6:
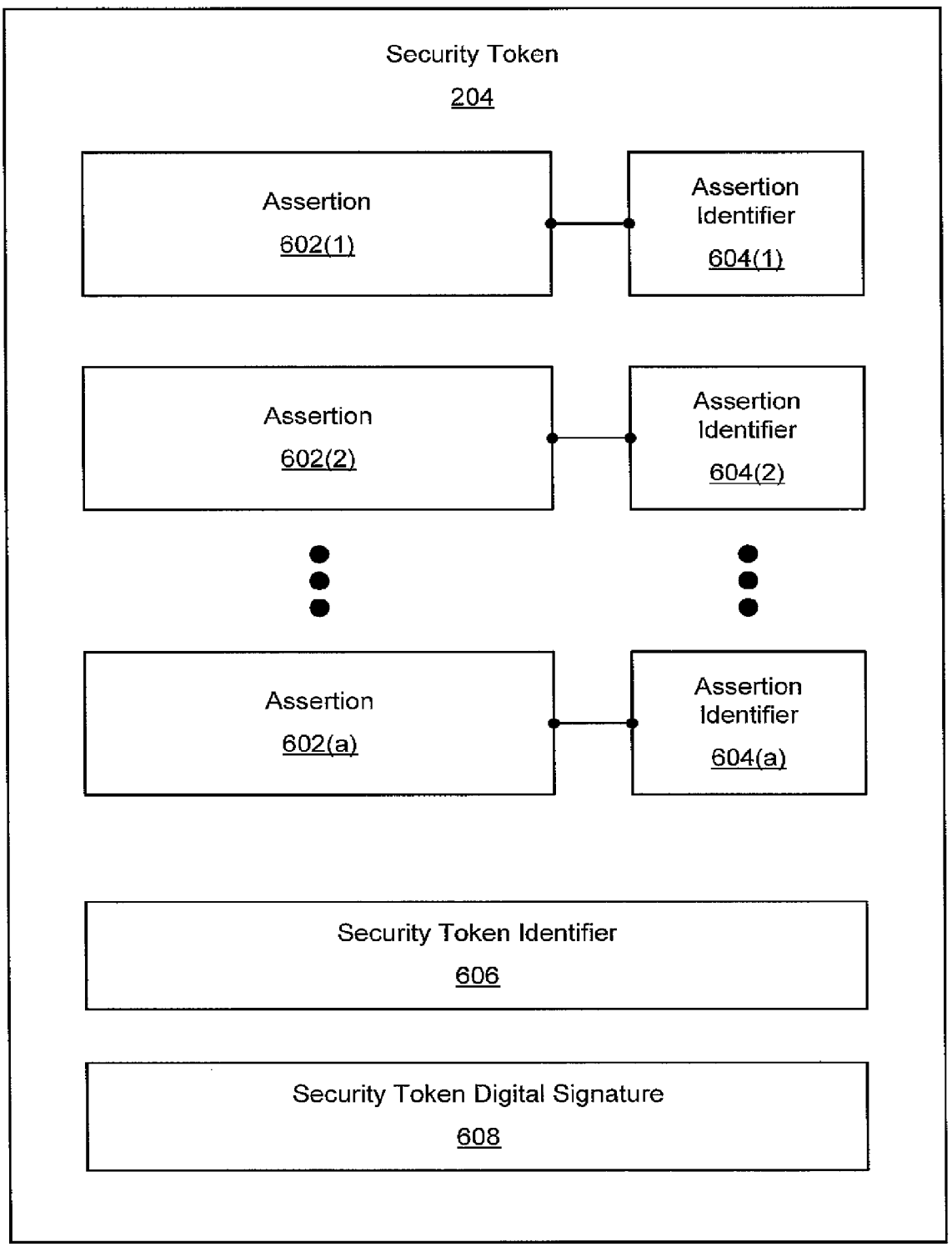
FIG. 6 is a block diagram of an example security token including multiple respective assertions that are associated with multiple respective assertion identifiers.

FIG. 6 is a block diagram of an example security token 204 including multiple respective assertions 602 that are associated with multiple respective assertion identifiers 604. As illustrated, security token 204 includes "a" assertions 602, with "a" being some integer. Each respective assertion 602($x$) is associated with a respective assertion identifier 604($x$). Hence, there are "a" assertion identifiers 604 illustrated in FIG. 6. Security token 204 also includes a security token identifier 606 and a security token digital signature 608.

In a described implementation, each assertion 602 is associated with at least one assertion identifier 604. Assertion identifier 604 may be integrated with its associated assertion 602, may be coupled to its associated assertion 602, or otherwise associated with its assertion 602. Specifically, assertion 602(1) is associated with assertion identifier 604(1), assertion 602(2) is associated with assertion identifier 604(2), . . . , assertion 602($a$) is associated with assertion identifier 604($a$).

As is described further herein below, an assertion identifier 604 enables its associated assertion 602 to be independently revoked separately from the remaining assertions 602 of a given security token 204. As is also described herein below, multiple assertions 602 (including all assertions 602) of a given security token 204 may be revoked using a single identification value for assertion identifiers 604. In other words, each assertion identifier 604 may be given a unique identification value or an identification value that is shared across one or more other assertion identifiers 604. Unique identification values may be generated using very large random numbers, using a counter mechanism in conjunction with an STS identifier, and so forth. In practice, such a unique identification value may comprise a globally-unique identifier (GUID).

Security token identifier 606, if present, also enables the entire security token 204 to be revoked with a single identification value. If so utilized, the identification value of security token identifier 606 can be relied on to revoke all assertions 602 of security token 204.

Security token digital signature 608, if present, is a digital signature for security token 204. Thus, security token digital signature 608 may be considered a single digital signature across all assertions 602 of security token 204. Alternatively, a single digital signature may cover or be applied across multiple, but not all, assertions 602 of a given security token 204. Security token digital signature 608 serves to provide authentication and/or integrity confirmation for data that it has signed.

Figure 7:
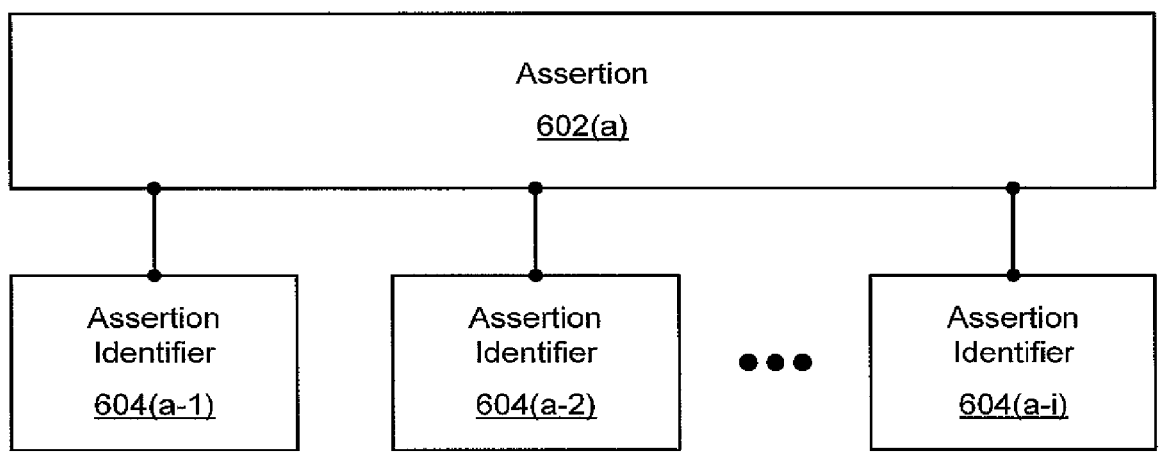
FIG. 7 is a block diagram of an example assertion that is associated with multiple assertion identifiers.

FIG. 7 is a block diagram of an example assertion 602($a$) that is associated with multiple assertion identifiers 604($a$). As illustrated, assertion 602($a$) is associated with "i" assertion identifiers 604($a$), with "i" being some integer greater than one in this multiple assertion identifier 604-per-assertion 602 implementation. Assertion 602($a$) is thus associated with assertion identifier 604($a$-1), assertion identifier 604($a$-2), . . . , assertion identifier 604($a$-i). Each assertion identifier 604($a$-x) may also be considered a different value of assertion identifier 604($a$).

In a described implementation, having multiple assertion identifiers 604 being associated with a single assertion 602 provides additional revocation options. For example, assertion identifier 604($a$-1) may have a unique identification value, and assertion identifier 604(a-2) may have an identification value that is common across three other assertions 602 (not shown in FIG. 7). In this example, referencing the unique identification value of assertion identifier 604(a-1) in a revocation statement revokes assertion 602(a) only. However, referencing the common identification value that is included as assertion identifier 604(a-2) in a revocation statement revokes assertion 602(a) and the other three assertions that are associated with the same assertion identifier identification value.

In these manners, revocation may be enabled and enforced at the granularity of assertions 602. Additional explanations and logical examples are provided below.

In a described implementation, a fine-grained revocation semantic that operates at the granularity of an individual security assertion is defined. It should be understood that security assertion revocation as described herein is generally applicable to assertions that adhere to any given format. However, by way of example only, the assertion format described in the preceding section is used to illuminate certain aspects of security assertion revocation as described herein.

Thus, as described above, an example general form of a security assertion is: principal says claim, where claim may be a fact or a conditioned fact (e.g., fact if $fact_1, \ldots, fact_2, \ldots, fact_n, c_{1, c2}, \ldots c_m$). In the examples that follow, principal is represented generically by A for assertor.

From a revocation perspective, such an example assertion may therefore be represented by: A says claim, ID=value. In this sense, the associated ID parameter may be part of the asserted fact. Multiple values forming a set of values may be identifiers that are assigned to the assertion.

An assertion may be revoked using another assertion of the form: A says A revoke ID=value. In other words, "A revoke ID=value" may be a fact expression in accordance with a general security assertion language. Multiple values may also be set equal to ID in the revocation assertion.

Revocation may also be realized using conditional revocations. An assertion of the following form is an example of a conditional revocation: A says A revokes ID=value if constraints. Such conditional revocations add significant flexibility. For instance, time limits or other environmental parameters/restrictions may be applied. An example of a conditional revocation that has a time constraint is:

A says A revoke ID=value if curr. time>09/20/2007.

The value of the ID parameter is assigned by the Assertor A, and it is encoded as a parameter within the fact expression. If A wants the ability to revoke individual assertions, this value is set to be unique across all assertions made by A. This uniqueness may be computed in several ways. Examples include, but are not limited to, using an incremental counter, generating a large random number, and so forth. Conversely, A may choose to assign the same ID value to multiple assertions. By repeatedly using the same ID revocation value, A can revoke multiple related assertions using a single revocation assertion and ID value.

This formulation enables A to selectively revoke any assertion A made previously in a manner that is independent from how a particular assertion was originally encoded in security token(s) and/or policy(s). This provides fine-grained control over what is being revoked and its resulting overall impact on the operation of a system, including a distributed system.

Generally, any assertor is permitted to revoke a prior assertion that it made. An assertor may also delegate the right to revoke its assertions to other principals using the delegation policy features of a security policy assertion language, for example. Thus, A can allow B to issue revocation information on its behalf by asserting the following example: A says B can assert A revoke i. B can therefore then assert the following: B says A revoke ID=value. When A's delegation assertion is logically combined with B's revocation assertion on A's behalf, one may logically conclude that A wishes to revoke the assertion(s) with ID=value.

Revocation assertions can be flexibly communicated using the same or similar language mechanisms in which security tokens and policies are expressed. Revocation assertions may also be interpreted using the same infrastructure. Thus, in addition to enabling the revocation scheme to have a fine granularity down to the level of an assertion, example described implementations reduce, if not eliminate, a need for special encoding and processing infrastructure to handle revocations.

Thus, an example described revocation mechanism operates at the granularity of individual assertions, instead of whole tokens, with multiple assertions being capable of being encoded into a single token. However, as described herein above, especially with reference to FIG. 7, implementations of the revocation mechanism can also simultaneously revoke multiple assertions.

This capability is further described by way of the following three examples. The ID-based assertion revocation mechanism allows one to efficiently revoke (i) a single assertion or (ii) multiple related assertions within a single security token or across multiple security tokens. Each assertion 602 may be assigned and associated with a set of two or more identification values, as indicated in FIG. 7.

A first example is:
A says ID=1,2 B can read Foo
A says ID=2,3 B can write Bar
A says ID=2,5 B possess groupName=Employee With the ID values of the first example, it enables one to revoke the individual assertions using the unique IDs=1 or 3 or 5. Additionally, it enables one to revoke all three assertions at once using a single revocation statement referencing a single assertion identifier ID=2.

For a second example, this ID-based revocation mechanism also allows one to encode K-of-N requirements or assertion dependencies by assigning a carefully planned set of identifiers to IDs. For example, if an asserter wishes to have K-of-N semantics equal to 2-of-3, it can be encoded as follows in this second example:
A says ID=1,2 B can read Foo
A says ID=2,3 B can write Bar
A says ID=1,3 B possess groupName=Employee With the ID values of the second example, any two of the three assertions above may be revoked in a single revocation assertion using a single identification value. For instance, the first two assertions may be revoked using: A revoke ID=2. Similarly, the last two assertions may be revoked using: A revoke ID=3. Also, the first and last assertions may be revoked using: A revoke ID=1.

For a third example, assume the reason "B can write Bar" was issued depended on "B can read Foo". If so, the former assertion can be forced to be revoked whenever the latter assertion is revoked. This third example may be implemented as:
A says ID=1 B can read Foo
A says ID=1,2 B can write Bar
A says ID=3 B possess groupName=Employee Whenever a revocation assertion in which ID=1 is issued to revoke the first assertion, the second assertion is also automatically revoked. This feature leverages the assertion granularity of the revocation mechanism to enable dependent assertions to be dependently revoked automatically.

Figure 8:
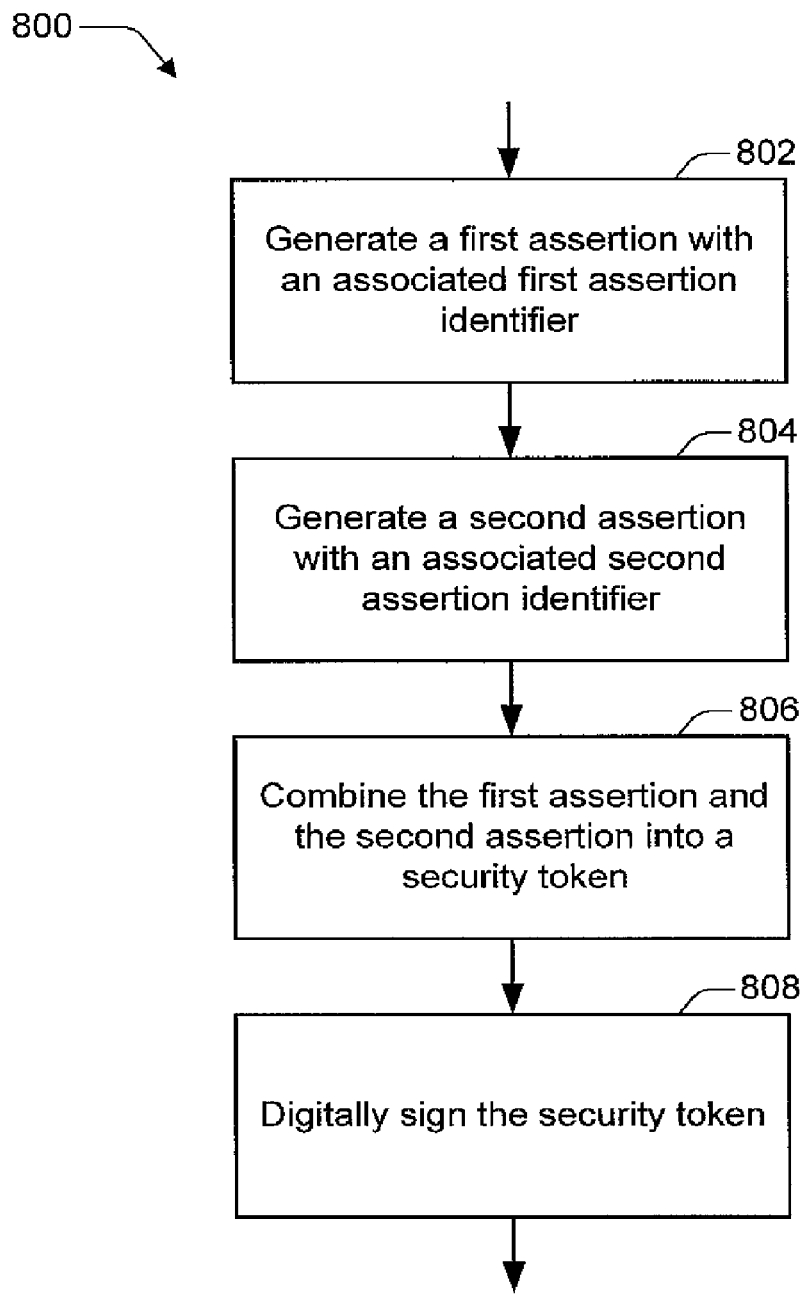
FIG. 8 is a flow diagram that illustrates an example of a method for creating a security token having respective assertions that are associated with respective assertion identifiers.

FIG. 8 is a flow diagram 800 that illustrates an example of a method for creating a security token having respective assertions that are associated with respective assertion identifiers. Flow diagram 800 includes four (4) blocks 802-808. Although the actions of flow diagram 800 may be performed in other environments and with a variety of hardware/software/firmware combinations, some of the features, components, and aspects of FIGS. 1-7 are used to illustrate an example of the method. For example, an entity 208, a device 102(A), and an STS authority 202 may jointly implement the actions of flow diagram 800.

At block 802, a first assertion with an associated first assertion identifier is generated. For example, assertion 602(1) that is associated with assertion identifier 604(1) may be generated by an asserter.

At block 804, a second assertion with an associated second assertion identifier is generated. For example, assertion 602(2) that is associated with assertion identifier 604(2) may be generated by the asserter.

At block 806, the first assertion and the second assertion are combined into a security token. For example, assertion 602(1) and assertion 602(2) may be combined into security token 204. The combining action(s) may be performed at device 102(A) or at STS authority 202.

At block 808, the security token is digitally signed. For example, security token digital signature 608 may be created and applied to security token 204 by STS authority 202. The digital signature of security token digital signature 608 serves to cover (e.g., to authenticate and possibly to guarantee integrity) for both assertion 602(1) and assertion 602(2). The digital signature may also serve to sign other assertions 602 and/or other parts of security token 204, including up to the entirety of the security-related data of security token 204.

Figure 9:
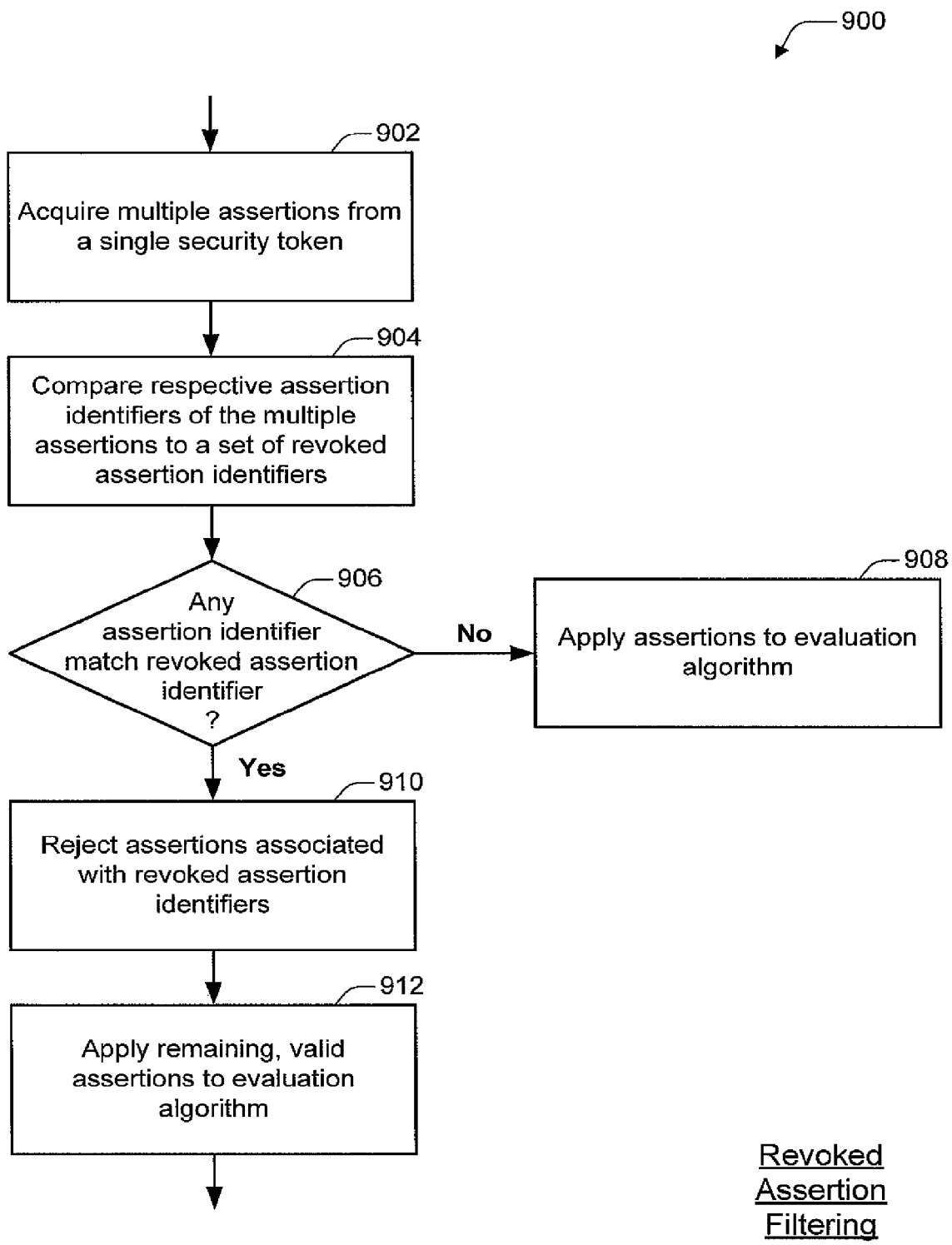
FIG. 9 is a flow diagram that illustrates an example of a method for filtering revoked assertions from an evaluation algorithm.

FIG. 9 is a flow diagram 900 that illustrates an example of a method for filtering revoked assertions from an evaluation algorithm. Flow diagram 900 includes six (6) blocks 902-912. Although the actions of flow diagram 900 may be performed in other environments and with a variety of hardware/sofware/firmware combinations, some of the features, components, and aspects of FIGS. 1-7 are used to illustrate an example of the method. For example, a resource guard 214 and/or an authorization engine 218 may separately or jointly implement the actions of flow diagram 900.

At block 902, multiple assertions are acquired from a single security token. By way of example, the multiple assertions may be acquired by extracting them from a single security token. Alternatively, an assertion context having multiple assertions from a single security token may be accepted. For instance, an assertion context having multiple assertions 602 from a single security token 204 may be accepted from an authorization context 212. The assertion context may also include other assertions (e.g., from a security policy).

At block 904, respective assertion identifiers that are associated with respective ones of the multiple assertions are compared to a set of revoked assertion identifiers. For example, resource guard 214 or authorization engine 218 may compare assertion identifiers 604, which are associated with assertions 602, to the assertion identifiers in a set of revoked assertion identifiers.

At block 906, it is determined if there are any assertion identifier or identifiers that match a revoked assertion identifier. If not, then at block 908 the assertions of the assertion context are applied to an evaluation algorithm. For example, assertions 602 of the assertion context may be applied to an evaluation algorithm part of authorization engine 218.

If, on the other hand, it is determined (at block 906) that there is at least one assertion identifier associated with an assertion from the assertion context that matches a revoked assertion identifier, then at block 910 the assertion(s) associated with the matching and therefore revoked assertion identifier is(are) rejected. For example, if assertion identifier 604 (a-2) (of FIG. 7) matches a revoked assertion identifier, then the associated assertion 602(a) may be rejected.

Rejected assertions 602 are excluded from any evaluation algorithm. From an alternative perspective, the revocation analysis and possible assertion rejection may be an initial or early phase of the evaluation algorithm prior to the logical analysis of an authorization query. At block 912, any remaining valid assertions are applied to the evaluation algorithm to determine if an authorization query may still be logically satisfied without the deducible facts of the rejected assertion(s).

Assertion revocation may also be described from a relatively-rigorous, logical perspective. In a described logical implementation of security assertion revocation, an assertion is a revocation assertion if it is of the form:

A says A revokes ID if c, or

A says $B_1$ can assert$_{D1}$ ... $B_n$ can assert$_{Dn}$ A revokes ID if c.

Given an assertion context AC and a set of revocation assertions $AC_{rev}$ where $AC \cap AC_{rev} = \emptyset$, the assertions revoked by $AC_{rev}$ are removed from AC before an authorization query is evaluated. The filtered assertion context is defined by:

AC−{M|M ∈ AC, A is the issuer of M, and $AC_{rev}$, ∞|=A says A revokes $ID_M$}, where "A is the issuer of M" implies that M is of the form "A says fact".

$AC_{rev}$ may also include conditional revocations, which are described herein above. The revocation of assertions may also be accomplished by an evaluation of queries, parameterized by assertion identifiers, using a separate set of assertions. In other words, there is an evaluation and querying against the assertions in the disjoint set $AC_{rev}$. If this set contains conditional revocation assertions, one can query for which revocation facts are valid in a given context. Only those revocations facts that are currently valid are then applied when filtering the assertions in AC using the filtering process defined above.

The condition that AC and $AC_{rev}$ are disjoint implies that revocation assertions cannot be revoked (at least not within the rules of the security language). When revocation assertions are allowed to revoke each other, the same problems and semantic ambiguities that result from negated body predicates in logic programming arise with the use of even one revoked revocation assertion. Although such problems can be otherwise formally surmounted (e.g., by only allowing stratifiable revocation sets, by computing the well-founded model, etc.), these approaches are likely not sufficiently straightforward to please users in a practical environment.

The devices, actions, aspects, features, functions, procedures, modules, data structures, protocols, components, etc. of FIGS. 1-9 are illustrated in diagrams that are divided into multiple blocks. However, the order, interconnections, interrelationships, layout, etc. in which FIGS. 1-9 are described and/or shown are not intended to be construed as a limitation, and any number of the blocks can be modified, combined, rearranged, augmented, omitted, etc. in any manner to implement one or more systems, methods, devices, procedures, media, apparatuses, APIs, protocols, arrangements, etc. for security assertion revocation.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A method for creating a security token having independently-revocable assertions, the method comprising:
generating a first assertion with an associated first assertion identifier;
generating a second assertion with an associated second assertion identifier, wherein the second assertion is independently-revocable with respect to the first assertion;
combining, at a computing device, the first assertion and the second assertion into the security token and digitally signing the security token comprising multiple independently-revocable assertions;
ascertaining, at the computing device, whether a plurality of conditional revocation assertions are valid;
in response to ascertaining that one or more conditional revocation assertions are valid, including a corresponding assertion identifier from each of the one or more valid conditional revocation assertions in a set of revoked assertion identifiers;
rejecting the first assertion when the first assertion identifier matches a revoked assertion identifier in the set of revoked assertion identifier; and
applying the second assertion to an evaluation algorithm when the second assertion identifier does not match any revoked assertion identifier in the set of revoked assertion identifiers.

2. The method as recited in claim 1, wherein the generating a first assertion with an associated first assertion identifier comprises:
generating the first assertion with the associated first assertion identifier, wherein the first assertion identifier comprises a set of values.

3. The method as recited in claim 1, wherein:
the generating a first assertion with an associated first assertion identifier comprises generating the first assertion with the associated first assertion identifier, wherein the first assertion identifier comprises a first value and a third value; and
the generating a second assertion with an associated second assertion identifier comprises generating the second assertion with the associated second assertion identifier, wherein the second assertion identifier comprises a second value and the third value.

4. The method as recited in claim 1, wherein the generating a first assertion with an associated first assertion identifier comprises:
generating the first assertion with the associated first assertion identifier, wherein the first assertion comprises a security assertion that is logically of the form:
principal says ID fact if $fact_1, \ldots, fact_n, c_1, \ldots, c_m$, with the first assertion identifier represented by ID and any constraints represented by $c_1, \ldots, c_m$, with "m" being an integer of zero or greater.

5. A computer-implemented method configured to execute instructions which, when executed by a computer processor, direct a computing device to perform acts for filtering revoked assertions, the method comprising:
acquiring multiple assertions from a security token at the computing device, each respective assertion of the multiple assertions associated with a respective assertion identifier of multiple assertion identifiers;
comparing the multiple assertion identifiers to a set of revoked assertion identifiers;
determining, by the computing device, if at least one assertion identifier of the multiple assertion identifiers matches a revoked assertion identifier of the set of revoked assertion identifiers; and
if at least one assertion identifier of the multiple assertion identifiers is determined to match a revoked assertion identifier of the set of revoked assertion identifiers, rejecting at least one assertion that is associated with the at least one assertion identifier that is determined to match the revoked assertion identifier; and
processing a revocation assertion that includes a revoked assertion identifier, wherein the revocation assertion comprises a security assertion and is logically of the form:
principal says fact,
in which fact corresponds to:
applying the plurality of assertions to the evaluation algorithm that evaluates the authorization query when no none of the at least one assertion identifier is determined to match any revoked assertion identifier of the set of revoked assertion identifiers.

6. The computer-implemented method as recited in claim 5, wherein the acquiring multiple assertions from a security token comprises at least one of:
accepting the multiple assertions of the security token as part of an assertion context; or
extracting the multiple assertions from the security token;
wherein the security token includes a digital signature covering at least the multiple assertions.

7. The computer-implemented method as recited in claim 5, further comprising:
applying any assertions of the multiple assertions that remain after the rejecting action to an evaluation algorithm involving an authorization query.

8. The computer-implemented method as recited in claim 5, further comprising:
ascertaining if one or more conditional revocation assertions are valid; and
if one or more conditional revocation assertions are ascertained to be valid, including assertion identifiers from the one or more valid conditional revocation assertions in the set of revoked assertion identifiers for the comparing and the determining actions.

9. The computer-implemented method as recited in claim 5, wherein the multiple assertion identifiers comprise a first assertion identifier having a particular value and a second assertion identifier having the particular value;
and wherein a particular revoked assertion identifier of the set of revoked assertion identifiers also has the particular value; and
wherein:
the determining comprises determining that the first assertion identifier and the second assertion identifier of the multiple assertion identifiers match the particular revoked assertion identifier of the set of revoked assertion identifiers; and
the rejecting comprises rejecting a first assertion of the multiple assertions that is associated with the first assertion identifier and a second assertion of the multiple assertions that is associated with the second assertion identifier.

10. The computer-implemented method as recited in claim 5, wherein the multiple assertion identifiers comprise a first assertion identifier having a first value and a second assertion identifier having a second value; and wherein a particular revoked assertion identifier of the set of revoked assertion identifiers also has the first value; and wherein:
the determining comprises determining that the first assertion identifier of the multiple assertion identifiers matches the particular revoked assertion identifier of the set of revoked assertion identifiers; and
the rejecting comprises rejecting a first assertion of the multiple assertions that is associated with the first assertion identifier and not rejecting a second assertion of the multiple assertions that is associated with the second assertion identifier.

11. One or more computer-readable memory storing computer-executable instructions that, when executed by a processor, configures the processor to perform acts comprising:
generating a plurality of assertions such that each assertion has an associated assertion identifier;
comparing each assertion identifier to a set of revoked assertion identifiers;
determining whether the each assertion identifier has a matching revoked assertion identifier from the set of revoked assertion identifiers;
when at least one assertion identifier is determined to match a revoked assertion identifier of the set of revoked assertion identifiers, rejecting a corresponding assertion of each assertion identifier that is matched with a corresponding revoked assertion identifier, and applying one or more remaining assertions to an evaluation algorithm that evaluates an authorization query; and
when no assertion identifier is determined to match any revoked assertion identifier of the set of revoked assertion identifiers, applying the plurality of assertions of the evaluation algorithm that evaluates the authorization query.

12. The one or more computer memory as recited in claim 11, wherein an assertion identifier comprises a set of values.

13. The one or more computer memory as recited in claim 11, wherein an assertion is a security assertion that is logically of the form:
principal says ID fact if $fact_1, \ldots, fact_n, c_1, \ldots, c_m$,
with a corresponding assertion identifier represented by ID and any constraints represented by $c_1, \ldots, c_m$, with "m" being an integer of zero or greater.

* * * * *